United States Patent [19]

Mishima et al.

[11] 4,437,881
[45] Mar. 20, 1984

[54] ACICULAR FERROMAGNETIC ALLOY PARTICLES AND PROCESS FOR PRODUCING SAID PARTICLES

[75] Inventors: Akio Mishima; Yoshiro Okuda; Tosiharu Harada; Akira Mukaizaka; Tomoyuki Imai, all of Hiroshima, Japan

[73] Assignee: Toda Kogyo Corp., Japan

[21] Appl. No.: 513,866

[22] Filed: Jul. 14, 1983

[30] Foreign Application Priority Data

Jul. 31, 1982 [JP] Japan .............................. 57-134016
Aug. 30, 1982 [JP] Japan .............................. 57-151467

[51] Int. Cl.³ .............................................. B22F 9/22
[52] U.S. Cl. ............................ 75/0.5 AA; 75/0.5 BA; 75/251; 148/105
[58] Field of Search ............. 75/0.5 AA, 0.5 BA, 251, 75/252; 148/105

[56] References Cited

U.S. PATENT DOCUMENTS

| | | | |
|---|---|---|---|
| 3,535,104 | 10/1970 | Little, Jr. et al. | 148/105 |
| 3,598,568 | 8/1971 | Klomp | 148/105 |
| 4,306,921 | 12/1981 | Suzuki et al. | 148/105 |
| 4,347,291 | 8/1982 | Tokuoka | 75/0.5 AA |

Primary Examiner—W. Stallard
Attorney, Agent, or Firm—Lyon & Lyon

[57] ABSTRACT

Acicular ferromagnetic alloy particles doped with silicon, chromium and nickel and optionally magnesium and a process for producing said particles comprising heating at 300° to 500° C. under reducing atmosphere acicular particles of α-iron(III) oxide hydroxide doped with silicon, chromium and nickel and optionally magnesium or acicular particles of α-ferric oxide doped with silicon, chromium and nickel and optionally magnesium obtained by dehydrating the acicular particles of α-iron(III) oxide hydroxide doped with silicon, chromium and nickel and optionally magnesium are disclosed herein.

15 Claims, 10 Drawing Figures

ACICULAR FERROMAGNETIC ALLOY PARTICLES AND PROCESS FOR PRODUCING SAID PARTICLES

BACKGROUND AND SUMMARY OF THE INVENTION

The present invention relates to acicular ferromagnetic alloy particles of improved particle properties, especially large specific surface and improved magnetic properties, especially high coercive force and large saturation magnetization which are suitable as a magnetic material for use in magnetic recording media. And, the present invention relates to a process for producing such acicular ferromagnetic alloy particles.

Recently, the improvements such as the miniaturizing and weight-lightening, the long-time recording and the like of the reproducing apparatus for magnetic recording, for example, video tape recorder, has been dramatically progressed. Accompanied by such improvements, the necessity for improving the qualities of the magnetic recording media such as magnetic tape, magnetic disk and the like has been more and more increasing. Especially, the magnetic recording media of high signal to noise ratio, little chroma noise and improved frequency characteristic have been requested. To fulfill such a request, the improvements of the magnetic material has been also requested since the above-mentioned specific properties of magnetic recording media depend upon the specific properties of the magnetic material, as described hereinafter.

To increase the signal to noise ratio of the recording media, the noise level due to the recording medium should be lowered. For that purpose, the micronization of the particle size of the magnetic particles and the improvements of their dispersibility in the vehicle and their orientation and packing in a coating medium are essential. Since the improvement of the latter brings also the surface smoothness to the recording media, such an improvement is important.

To reduce the chroma noise, the improvement of the surface smoothness of the recording medium is important, which depends upon the dispersibility in the vehicle and the orientation and packing in a coating medium of the magnetic particles.

To improve the frequency characteristic, the improvements of coercive force and residual magnetic flux density of the recording medium are important, each of which depends upon the coercive force and the saturation magnetization of the magnetic particles. Further, the latter depends upon their dispersibility in a vehicle and their orientation and packing in a coating medium.

As clear from the above-mentioned, it is necessary that the magnetic particles have excellent acicularity and the particle size thereof is uniform without the contamination of the dentrites and the apparent density thereof is as possible as large to improve their dispersibility in the vehicle and their orientation and packing in a coating medium. In addition, the specific surface area of the magnetic particle which is an index of the particle size and the coercive force as well as the saturation magnetization thereof are necessarily as large as possible.

As the magnetic material ferromagnetic iron oxide particles are conventionally employed in magnetic media, but the ferromagnetic iron oxide particles are not satisfactory in both their particle properties and their magnetic properties. The improved magnetic materials are acicular ferromagnetic iron particles and acicular ferromagnetic alloy particles obtained by heating acicular particles of α-iron(III) oxide hydroxide, acicular α-ferric oxide particles, each of these containing metal(s) different from iron in a flow of reducing gas at about 350° C. Although the thus-obtained particles have relatively satisfactory magnetic properties, they have not excellent acicularity and uniformity in particle size and the dentrites are coexistent therein. This is due to the α-iron(III) oxide hydroxide as a starting material.

The most representative process for producing the acicular particles of α-iron(III) oxide hydroxide comprises blowing an oxygen-containing gas into an aqueous suspension containing precipitated ferrous hydroxide obtained by adding an aqueous alkali solution in an amount more than the equivalent into an aqueous solution of a ferrous salt at a temperature of lower than 80° C. and at a pH of over 11 to effect the oxidation. However, the thus-obtained acicular particles of α-iron(III) oxide hydroxide are around 0.5 to 1.5 μm in length of long axis and their axial ratio is at most 10:1 and the dentrites are coexistent therein. One of this cause is in that the particle sizes of both the flock of ferrous hydroxide which is the precursor of the acicular particles of α-iron(III) oxide hydroxide and the ferrous hydroxide particles themselves which constitute the flock of ferrous hydroxide are not uniform. Further, the other cause, is in that the stage of the formation of the nuclei of the acicular particles of α-iron(III) oxide hydroxide and the stage of the growth of the nuclei of acicular particles proceed simultaneously since the contact of ferrous hydroxide with dissolved oxygen to form the nuclei of the acicular particles of α-iron(III) oxide hydroxide is partial and uneven.

A method for preparing the acicular particles of α-iron(III) oxide hydroxide which have the uniformity in particle size and do not contain the dentrites is to add a water-soluble silicate such as sodium silicate, potassium silicate and the like in an amount of 0.1 to 1.7 atomic % calculated as the ratio of Si to Fe(II) and based on the amount of ferrous hydroxide in the suspension (hereinafter referred to as simply "calculated as the ratio of Si/Fe(II)") into the aqueous alkali solution or the aqueous suspension containing ferrous hydroxide in advance of the blowing of an oxygen-containing gas into the aqueous suspension containing ferrous hydroxide (refer to Japanese Patent Publication Nos. 8461/80 and 32652/80). By such an addition of the water-soluble silicate, the minute flocks of ferrous hydroxide and the minute particles of ferrous hydroxide can be obtained with uniform particle size, and further the nuclei of the acicular particles of α-iron(III) oxide hydroxide grow after the formation of the nuclei thereof is completed. Accordingly, the thus-obtained acicular particles of α-iron(III) oxide hydroxide have excellent acicularity and the particle size thereof is uniform without the contamination of the dentrites, they being to be said a favorable starting material. As a result, the acicular ferromagnetic alloy particles obtained by reducing the favorable starting material have also the uniformity in particle size without the contamination of the dentrites and so the apparent density thereof is satisfactory. The other properties such as the dispersibility, the orientation and the like except the specific surface area are also satisfactory. As the specific surface area of these magnetic particles is around 20 m²/g, however, they are undesirable on the whole.

Accordingly, the object of the present invention is to provide the acicular ferromagnetic alloy particles having the above-mentioned specific properties necessary for use as the magnetic recording medium.

Another object of the present invention is to provide a process for producing such acicular ferromagnetic alloy particles.

These and other objects of the present invention will become more apparent from the following description.

The foregoing and the other objects of the present invention will be accomplished by the use of the α-iron-(III) oxide hydroxide doped with silicon, chromium and nickel as the starting material.

BRIEF EXPLANATION OF DRAWINGS

FIGS. 5 to 10 are electron microscope photographs taken at a magnification of 20000 times. FIGS. 5 to 7 show the acicular particles of α-iron(III) oxide hydroxide doped with silicon, chromium and nickel obtained in Example 1, the acicular ferromagnetic particles of α-iron(III) oxide hydroxide doped with silicon, chromium, nickel and magnesium obtained in Example 14 and the acicular particles of α-iron(III) oxide hydroxide obtained in Comparative Example 1. FIGS. 8 to 10 show the ferromagnetic alloy particles doped with silicon, chromium and nickel obtained in Example 31, the ferromagnetic alloy particles doped with silicon, chromium, nickel and magnesium obtained in Example 45 and the acicular ferromagnetic iron particles obtained in Comparative Example 2.

DETAILED DESCRIPTION OF THE INVENTION

The acicular ferromagnetic alloy particles doped with silicon, chromium and nickel according to the present invention have large specific surface area while maintaining the excellent acicularity and the uniform particle size, and high coercive force as well as large saturation magnetization. The acicular ferromagnetic alloy particles doped with silicon, chromium and nickel of the present invention can be prepared by using the acicular particles of α-iron(III) oxide hydroxide doped with silicon, chromium and nickel or the acicular α-ferric oxide particles doped with silicon, chromium and nickel obtained by heating the acicular particles of α-iron(III) oxide hydroxide as the starting material particles and reducing these particles. The α-iron(III) oxide hydroxide doped with silicon, chromium and nickel used as the starting material particles can be obtained in forming the acicular particles of α-iron(III) oxide hydroxide doped with silicon by further adding a water-soluble chromium salt and a water-soluble nickel salt into the aqueous solution of the ferrous salt, the aqueous alkali solution, the aqueous suspension containing ferrous hydroxide in advance of the blowing of an oxygen-containing gas or the aqueous suspension containing ferrous hydroxide during the blowing of an oxygen-containing gas.

As mentioned above, the acicular ferromagnetic alloy particles doped with silicon, chromium and nickel of the present invention have large specific surface area and high coercive force. Moreover, to improve the specific surface area and the coercive force a water-soluble magnesium salt can be added in a similar manner. Namely, the water-soluble magnesium salt is added into the aqueous solution of the ferrous salt, the aqueous alkali solution, the aqueous suspension containing ferrous hydroxide in advance of the blowing of the oxygen-containing gas or the aqueous suspension containing the ferrous hydroxide during the blowing of the oxygen-containing gas, to form the acicular particles of α-iron(III) oxide hydroxide doped with silicon, chromium, nickel and magnesium which used as the starting material particles. Reducing the thus-formed particles, the acicular ferromagnetic alloy particles doped with silicon, chromium, nickel and magnesium having the improved specific surface area and coercive force can be obtained.

Based upon the experimental results obtained by the inventors of the present invention, the conditions and the effects of the addition of the water-soluble chromium salt, the water-soluble nickel salt and the water-soluble magnesium salt will be described as follows while referring to the attached drawings.

Figure 1:
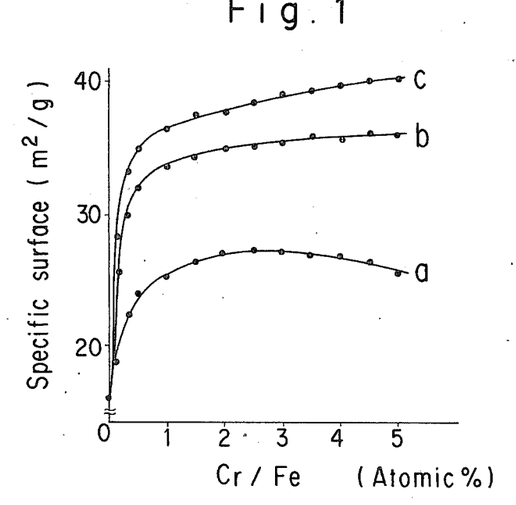
FIG. 1 shows a relation between the specific surface area of the acicular ferromagnetic alloy particles and the added amount of water-soluble chromium salt.

FIG. 1 shows the relation between the specific surface area of the acicular ferromagnetic alloy particles and the added amount of the water-soluble chromium salt. The acicular ferromagnetic alloy particles used are the acicular ferromagnetic alloy particles doped with silicon and chromium obtained by oxidizing the aqueous suspension of pH 13.8 and containing ferrous hydroxide which is prepared by adding 300 l of an aqueous solution of ferrous sulfate at a concentration of 1.2 mol/liter into 400 l of an aqueous sodium hydroxide solution containing sodium silicate in an amount of 0 to 1.0 atomic % calculated as the ratio of Si to Fe(II) and based on the amount of the ferrous hydroxide in the suspension (hereinafter referred to as simply "calculated as the ratio of Si/Fe(II)") and chromium sulfate in an amount of 0 to 5.0 atomic % calculated as the ratio of Cr to Fe(II) and based on the amount of the ferrous hydroxide in the suspension (hereinafter referred to as simply "calculated as the ratio of Cr/Fe(II)" by blowing air at 45° C. at a rate of 1000 liters per minute thereinto to form the acicular particles of α-iron(III) oxide hydroxide doped with silicon and chromium followed by reducing at 430° C. for 4.0 hours.

Curves a, b and c in the drawing indicate the case of no-addition of silicate, the case of the addition of 0.35 atomic % of silicate calculated as Si/Fe(II) and the case of the addition of 1.0 atomic % of silicate calculated as Si/Fe(II), respectively. As shown in FIG. 1, there is a tendency of the increase of the specific surface area of the particle with the increase of the amount of the added water-soluble chromium salt, chromium sulfate. This tendency is more clear when the silicate is added in combination with the chromium salt.

The acicular ferromagnetic alloy particles doped with silicon and chromium have excellent acicularity and uniformity in particle size without the contamination of the dentrites, and further they have large specific surface area. The synergistic effect of silicon and chromium is considered to give these advantages. However, with the added amount of the chromium salt, the coercive force of the ferromagnetic alloy particles doped with silicon and chromium tends to fall.

Figure 2:
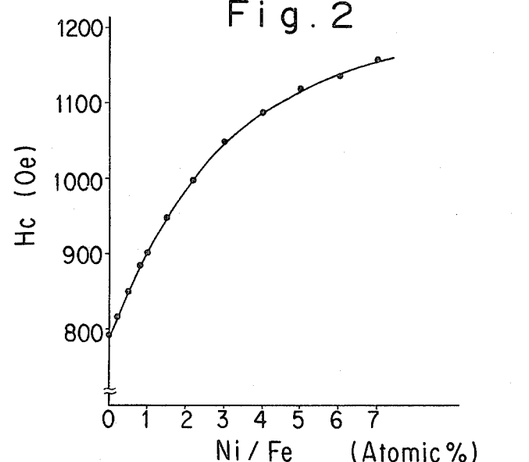
FIG. 2 shows the relation between the coercive force (Hc) of the acicular ferromagnetic alloy particles and the added amount of water-soluble nickel salt.

FIG. 2 shows the relation between the coercive force of the acicular ferromagnetic alloy particles and the added amount of the water-soluble nickel salt. The acicular ferromagnetic alloy particles used are the acicular ferromagnetic alloy particles doped with silicon, chromium and nickel obtained by oxidizing the aqueous suspension of pH 14.0 and containing ferrous hydroxide which is prepared by adding 300 l of an aqueous solution of ferrous salt at a concentration of 1.2 mol/liter into 400 l of an aqueous sodium hydroxide solution containing sodium silicate in an amount of 0.35 atomic % calculated as Si/Fe(II), chromium sulfate in an amount of 0.5 atomic % calculated as Cr/Fe(II) and nickel sulfate in an amount of 0 to 7.0 atomic % calculated as the ratio of Ni to Fe(II) and based on the amount of the ferrous hydroxide in the suspension (hereinafter referred to as simply "calculated as the ratio of Ni/Fe(II)") by blowing air at 45° C. at a rate of 1000 liter per minute thereinto to form the acicular particles of α-iron(III) oxide hydroxide doped with silicon, chromium and nickel followed by reducing at 420° C. for 4.0 hours.

As shown in FIG. 2, there is a tendency of the increase of the coercive force of the particles with the increase of the added amount of the water-soluble nickel salt, nickel sulfate while maintaining the large specific surface area. These advantages are considered to be owing to the synergistic effect of silicon, chromium and nickel.

Figure 3:
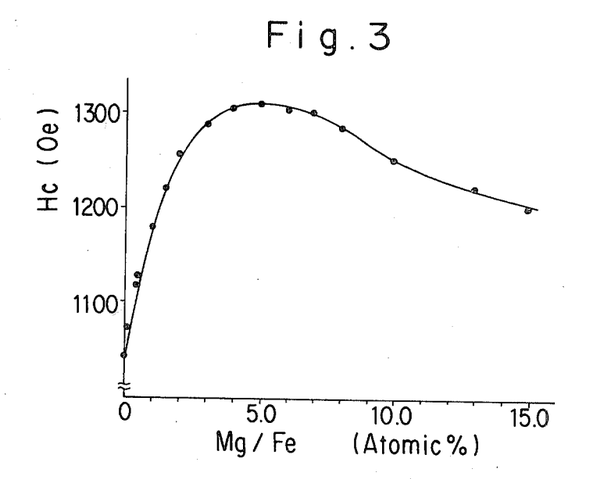
FIG. 3 shows the relation between the coercive force (Hc) of the acicular ferromagnetic alloy particles and the added amount of water-soluble magnesium salt.
Figure 4:
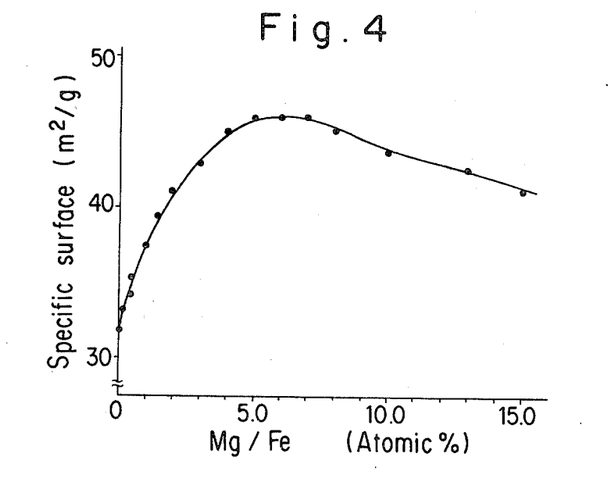
FIG. 4 shows the relation between the specific surface area of the acicular ferromagnetic alloy particles and the added amount of water-soluble magnesium salt.

FIG. 3 shows the relation between the coercive force of the acicular ferromagnetic alloy particles and the added amount of the water-soluble magnesium salt and FIG. 4 shows the relation between the specific surface area thereof and the added amount of the water-soluble magnesium salt. The ferromagnetic alloy particles used are the ferromagnetic alloy particles doped with silicon, chromium, nickel and magnesium obtained by oxidizing the aqueous suspension of pH 14.0 and containing ferrous hydroxide which is prepared by adding 300 l of an aqueous solution of ferrous sulfate at a concentration of 1.2 mol/liter into 400 l of an aqueous sodium hydroxide solution containing sodium silicate in an amount of 0.35 atomic % calculated as Si/Fe(II), chromium sulfate in an amount of 0.50 atomic % calculated as Cr/Fe(II), nickel sulfate in an amount of 3.0 atomic % calculated as Ni/Fe(II) and magnesium sulfate in an amount of 0 to 15.0 atomic % calculated as the ratio of Mg to Fe(II) and based on the amount of the ferrous hydroxide in the suspension (hereinafter referred to as simply "calculated as the ratio of Mg/Fe(II)") by blowing air at 50° C. at a rate of 1000 l per minute thereinto to form the acicular particles of α-iron(III) oxide hydroxide doped with silicon, chromium, nickel and magnesium followed by reducing at 420° C. for 4.5 hours.

As shown in FIGS. 3 and 4, there is a tendency of the increases in both coercive force and specific surface area of the particles with the increase of the added amount of the water-soluble magnesium salt, magnesium sulfate. These advantages are considered to be owing to the synergistic effect of silicon, chromium, nickel and magnesium.

Now the condition for carrying out the process of the present invention will be explained in detail as follows.

To obtain the acicular ferromagnetic alloy particles of the present invention, the acicular particles of α-iron(III) oxide hydroxide doped with silicon, chromium and nickel (and if desired magnesium) should be firstly formed. For that purpose, a water-soluble chromium salt and a water-soluble nickel salt (and if desired a water-soluble magnesium salt) in addition to a water-soluble silicate are added in forming the acicular particles of α-iron(III) oxide hydroxide.

The water-soluble chromium salt to be used in the process of the present invention includes chromium sulfate, chromium chloride and the like.

The amount of water-soluble chromium salt to be used is 0.1 to 5.0 atomic % calculated as Cr/Fe(II). In the case where the added amount is less than 0.1 atomic % calculated as Cr/Fe(II), the effect of increasing the specific surface area of the particles which is the object of the addition of water-soluble chromium salt is not attained. While, in the case where the added amount is more than 5.0 atomic %, although the large specific surface area can be obtained, it is not so favorable because of the greatly reduced coercive force and saturation manetization of the thus-obtained acicular ferromagnetic alloy particles.

The water-soluble nickel salt to be used in the process of the present invention includes nickel sulfate, nickel chloride, nickel nitrate and the like.

The amount of water-soluble nickel salt to be used is 0.1 to 7.0 atomic % calculated as Ni/Fe(II). In the case where the added amount is less than 0.1 atomic % calculated as Ni/Fe(II), the effect of improving the coercive force of the particles which is the object of the addition of water-soluble nickel salt is not exhibited satisfactorily. While, in the case where the added amount is more than 7.0 atomic % calculated as Ni/Fe(II), although the large coercive force can be obtained it is not so favorable because of the contamination of the undesirable non-acicular particles.

The water-soluble magnesium salt to be used in the present invention includes magnesium sulfate, magnesium chloride and the like.

The amount of water-soluble magnesium salt to be used is 0.1 to 15.0 atomic % calculated as Mg/Fe(II). In the case where the added amount is less than 0.1 atomic % calculated as Mg/Fe(II), the effect of improving the specific surface area and the coercive force of the particles which is the object of the addition of water-soluble magnesium salt can be obtained satisfactorily. While, in the case where the added amount is more than 15.0 atomic % calculated as Mg/Fe(II), although the improved specific surface area and coercive force can be obtained, it is not so favorable because of the greatly reduced saturation magnetization of the particles.

These water-soluble salts should be present when the nuclei of the acicular particles of α-iron(III) oxide hydroxide are formed, and accordingly the addition of these water-soluble salts may be carried out into the aqueous solution of the ferrous salt, the aqueous alkali solution, the aqueous suspension containing ferrous hydroxide in advance of the blowing of the oxygen-containing gas or the aqueous suspension containing ferrous hydroxide during the blowing of the oxygen-containing gas. Even if the water-soluble salt is added in the stage where the formation of the nuclei of the acicular particles of α-iron(III) oxide hydroxide are completed, any satisfactory effects can not be obtained. The thus added water-soluble salts are economically diffused into the acicular particles of α-iron(III) oxide hydroxide, and each doped amount of chromium and nickel and optionally magnesium in the particles is substantially same as the added amount of each of the water-soluble salts, as clearly shown in the following Tables.

In the next step, the thus-prepared acicular particles of α-iron(III) oxide hydroxide doped with silicon, chromium and nickel (and magnesium if desired) are heat-treated at 300° to 500° C. in a flow of reducing gas. In the case of the heat-treating temperature of not higher than 300° C., the reduction reaction progresses very slowly and requires long time. On the other hand, in the case of the temperature of not lower than 500° C., the deformation of the acicularity of the particles and the sintering between the particles are caused. Accordingly, both the temperature of heat-treatment of not higher than 300° C. and the temperature of not less than 500° C. are not favorable.

Now the advantage of the present invention will be summarized as follows.

According to the present invention, the acicular ferromagnetic alloy particles of superior specific properties can be obtained. The acicular ferromagnetic alloy particles of the present invention have the improved particle properties, especially excellent acicularity and uniformity in particle size without the contamination of the dentrites, high apparent density and large specific surface area. Besides, they have the improved magnetic properties, especially high coercive force and large saturation magnetization. Accordingly, the particles of the present invention are favorably suitable as the magnetic material for recording of high quality, high output, high sensitivity and high recording density, which are at present most keenly required.

In addition, when the acicular ferromagnetic alloy particles according to the present invention is used in the production of magnetic paint, they exhibit superior dispersibility in a vehicle and superior orientation and packing in a coating medium contributing to the production of the preferable magnetic recording media.

Now the present invention will be described by the examples and the comparative examples.

The length of long axis and the axial ratio (long axis: short axis) of the particle in the examples and comparative examples were measured by electron microscope photograph and indicated as the mean value, respectively.

The specific surface area of the particle was measured by the BET method.

The apparent density of the particle was measured by "Pigment Test Methods" of JIS K 5101-1978.

The amounts of Si, Cr, Ni and Mg in the particle was measured by the X-ray fluorescent analysis according to "General Rules in X-ray fluorescence Analysis" of JIS K 0119-1979 while using an X-ray fluorescence analytical apparatus, Model 3063M (RIKAGAKU-DENKI-KOGYO Co. Ltd. of Japan).

The magnetic properties of the magnetic tape were determined under the external magnetic field of 10 KOe.

PREPARATION OF STARTING MATERIAL PARTICLES

EXAMPLE 1

Into 400 liters of an aqueous 5.45 N sodium hydroxide solution in which 152 g of sodium silicate (corresponding to 28.55 % by weight of $SiO_2$) to contain 0.20 atomic % calculated as Si/Fe(II), 644 g of chromium sulfate to contain 0.50 atomic % calculated as Cr/Fe(II) and 2884 g of nickel sulfate to contain 3.0 atomic % calculated as Ni/Fe(II) had been added, 300 liters of an aqueous solution of ferrous sulfate at a concentration of 1.20 mol/liter was added, whereby a formation of an aqueous suspension of Fe(OH)$_2$ containing silicon, chromium and nickel ions was carried out at a temperature of 45° C. and pH of 14.0. Into the thus-prepared aqueous suspension, air was blown at a rate of 1000 liters/minute for 6.3 hours at 50° C. to form acicular particles of α-iron(III) oxide hydroxide doped with silicon, chromium and nickel. The termination of the oxidation reaction was determined by the blue colour reaction test of Fe(II) with red prussiate solution after extracting a portion of the reaction solution and acidifying it with hydrochloric acid.

The reaction mixture was then filtered to recover the thus formed acicular particles of α-iron(III) oxide hydroxide doped with silicon, chromium and nickel, and the particles were washed with water, a part of which was dried and pulverized to be specimens for analysis and electron microscope photographic observation.

According to the X-ray diffraction, the thus obtained acicular particles of α-iron(III) oxide hydroxide doped with silicon, chromium and nickel gave the same diffraction pattern as that of the authentic particles of α-iron(III) oxide hydroxide, and the results of X-ray fluorescence analysis of the specimen indicated the presence of silicon in an amount of 0.204 atomic % calculated as Si/Fe(II), chromium in an amount of 0.496 atomic % calculated as Cr/Fe(II) and nickel in an amount of 3.02 atomic % calculated as Ni/Fe(II). From these results, it is considered that the acicular particles of α-iron(III) oxide hydroxide contain silicon, chromium and nickel ions in the crystal lattice.

Figure 5:
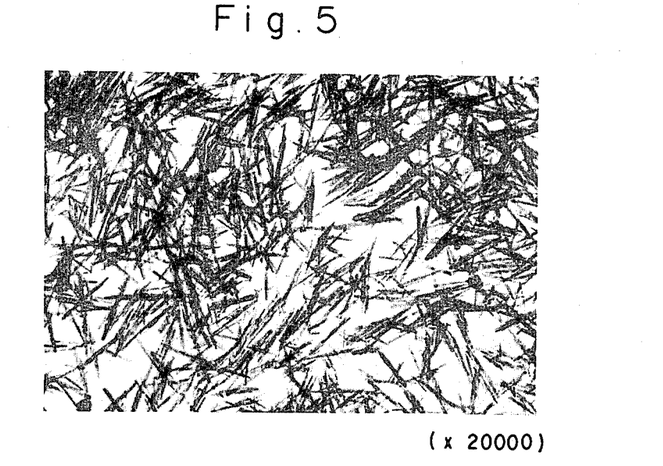

FIG. 5 shows the electron microscope photograph of 20000 times in magnification of the acicular particles of α-iron(III) oxide hydroxide doped with silicon, chromium and nickel. As is seen in FIG. 5, the thus obtained particles was 0.50 μm in length and the axial ratio of 28:1 on the average, and the particle size thereof was uniform without the contamination of dentrites.

EXAMPLES 2 TO 13

In the same manner as in Example 1 except for variously changing the kind and the concentration of aqueous solution of ferrous salt, the concentration of aqueous sodium hydroxide solution and the kind and the amount of water-soluble silicate, water-soluble chromium salt and water-soluble nickel salt and the time of addition thereof as shown in Table 1, the acicular particles of α-iron(III) oxide hydroxide doped with silicon, chromium and nickel were prepared, the main condition for the preparation and the properties of the particles being also shown in Tables 1 and 2.

However, in Example 5 the formation of the aqueous suspension of Fe(OH)$_2$ was carried out at a temperature of 40° C. and the formation of the acicular particles of α-iron(III) oxide hydroxide was carried out at a temperature of 45° C.

EXAMPLE 14

Into 400 liters of an aqueous 5.46 N sodium hydroxide solution in which 379 g of sodium silicate (corresponding to 28.55% by weight of $SiO_2$) to contain 0.50 atomic % calculated as Si/Fe(II), 644 g of chromium sulfate to contain 0.50 atomic % calculated as Cr/Fe(II), 2884 g of nickel sulfate to contain 3.0 atomic % calculated as Ni/Fe(II) and 4473 g of magnesium sulfate to contain 5.0 atomic % calculated as Mg/Fe(II) had been added, 300 liters of an aqueous solution of ferrous sulfate at a concentration of 1.20 mol/liter was added, whereby the formation of an aqueous suspension of Fe(OH)$_2$ containing silicon, chromium, nickel and magnesium ions was carried out at a temperature of 45° C. and pH of 13.8.

The thus-prepared aqueous suspension was treated in the same manner as in Example 1 except for the change of the blowing time of air to 5.1 hours to form the acicular particles of α-iron(III) oxide hydroxide doped with silicon, chromium, nickel and magnesium.

According to the X-ray diffraction, the thus obtained acicular particles of α-iron(III) oxide hydroxide doped with silicon, chromium, nickel and magnesium gave the same pattern as that of the authentic particles of α-iron(III) oxide hydroxide, and the results of X-ray fluorescence analysis indicated the presence of silicon in an amount of 0.504 atomic % calculated as Si/Fe(II), chromium in an amount of 0.498 atomic % calculated as Cr/Fe(II), nickel in an amount of 3.03 atomic % calculated as Ni/Fe(II) and magnesium in an amount of 4.98 atomic % calculated as Mg/Fe(II). From these results, it is considered that the acicular particles of α-iron(III) oxide hydroxide contain silicon, chromium, nickel and magnesium ions in the crystal lattice.

Figure 6:
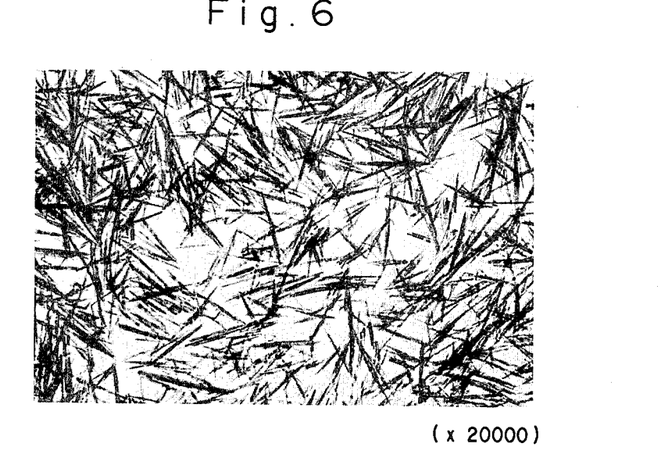

FIG. 6 shows the electron microscope photograph of 20000 times in magnification of the acicular particles of α-iron(III) oxide hydroxide doped with silicon, chromium, nickel and magnesium. As seen in FIG. 6, the thus obtained particles was 0.55 μm in length and the axial ratio of 33:1 on the average, and the particle size thereof is uniform without the contamination of dentrites.

EXAMPLES 15 TO 28

In the same manner as in Example 14 except for variously changing the kind and the concentration of aqueous solution of ferrous salt, the concentration of aqueous sodium hydroxide solution and the kind and the amount of water-soluble silicate, water-soluble chromium salt, water-soluble nickel salt and water-soluble magnesium salt and the time of addition thereof as shown in Table 3, the acicular particles of α-iron(III) oxide hydroxide doped with silicon, chromium, nickel and magnesium were prepared, the main condition for the preparation and the properties of the particles being also shown in Tables 3 and 4.

COMPARATIVE EXAMPLE 1

Figure 7:
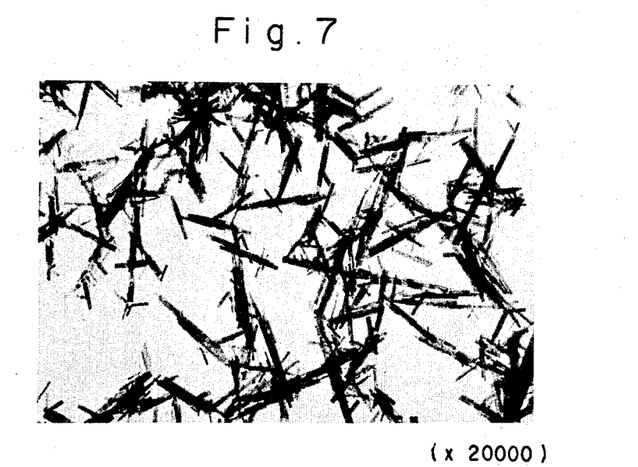

In the same manner as in Example 1, however, without adding sodium silicate, chromium sulfate and nickel sulfate, the acicular particles of α-iron(III) oxide hydroxide were prepared under the conditions shown in Table 1. The specific properties of the product is shown in Table 2. FIG. 7 shows the electron microscope photograph of 20000 times in magnification of the acicular particles of α-iron(III) oxide hydroxide.

As is seen in FIG. 7, the thus obtained particles was 0.45 μm in length and the axial ratio of 9:1 on the average. Their particle size was not uniform and the dentrites were found therein.

PREPARATION OF ACICULAR α-FERRIC OXIDE PARTICLES

EXAMPLE 29

3000 g of the acicular particles of α-iron(III) oxide hydroxide doped with silicon, chromium and nickel obtained in Example 5 were heat-treated in the air at 300° C. to obtain the acicular particles of α-ferric oxide doped with silicon, chromium and nickel.

As a result of the X-ray fluorescent analysis of the thus obtained particles, it was detected that silicon, chromium and nickel were present therein in an amount of 0.256 atomic % calculated as Si/Fe(II), 0.499 atomic % calculated as Cr/Fe(II) and 5.03 atomic % calculated as Ni/Fe(II), respectively.

According to electron microscope photographic observation, the length of the thus obtained particle was 0.38 μm and the axial ratio thereof was 30:1 on the average, and the particle size thereof was uniform without the contamination of the dentrites.

EXAMPLE 30

In the same manner as in Example 29, the acicular particle of α-ferric oxide doped with silicon, chromium, nickel and magnesium were prepared while using the acicular particles of α-iron(III) oxide hydroxide doped with silicon, chromium, nickel and magnesium obtained in Example 15.

As a result of the X-ray fluorescent analysis of the thus obtained particles, it was detected that silicon, chromium, nickel and magnesium were therein in an amount of 0.350 atomic % calculated as Si/Fe(II), 0.498 atomic % calculated as Cr/Fe(II), 4.98 atomic % calculated as Ni/Fe(II) and 3.02 atomic % calculated as Mg/Fe(II), respectively.

According to electron microscope photographic observation, the length of the thus obtained particles was 0.65 μm and the axial ratio of the particle was 45:1 on the average, and the particle size thereof was uniform without the contamination of the dentrites.

PREPARATION OF ACICULAR FERROMAGNETIC ALLOY PARTICLES OR ACICULAR FERROMAGNETIC IRON PARTICLES

EXAMPLE 31

In a 3-liter rotary retort, 100 g of the acicular particles of α-iron(III) oxide hydroxide doped with silicon, chromium and nickel obtained in Example 1, was placed, and hydrogen gas was passed through the retort at a rate of 35 liters/minute and at 390° C. while rotating the retort to carry out the reduction of the particles therein. After the reduction was over, the product was once soaked in toluene and toluene was evaporated to form a stable oxidized membrane on the surface of the particles in order to prevent the sudden oxidation when the product was put out from the retort into the ambient air. The thus produced acicular ferromagnetic alloy particles doped with silicon, chromium and nickel showed the same X-ray diffraction pattern of a single phase of body-centered cubic lattice as that of iron, and as a result of fluorescent X-ray analysis, 0.203 atomic % calculated as Si/Fe(II) of silicon, 0.498 atomic % calculated as Cr/Fe(II) of chromium and 3.02 atomic % calculated as Ni/Fe(II) of nickel were detected in the product. Accordingly, it is considered that iron, silicon, chromium and nickel are in a state of solid solution.

Figure 8:
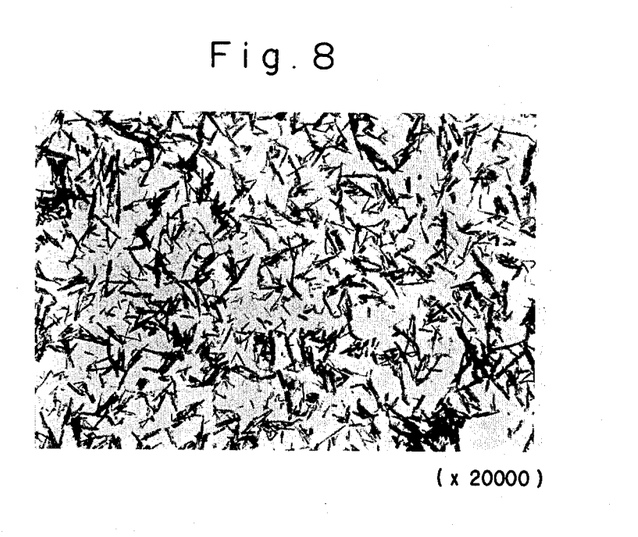

FIG. 8 shows the electron microscope photograph of 20000 times in magnification of the acicular ferromagnetic alloy particles doped with silicon, chromium and nickel. As is seen in FIG. 8, the thus obtained particles was 0.28 μm in length and the axial ratio of 8:1 on the average, and the particle size thereof was uniform without the contamination of dentrites. The specific surface area and the apparent density of the particles were 38.6 m$^2$/g and 0.43 g/ml, respectively. And the particles had 1130 Oe of coercive force and 164.5 emu/g of saturation magnetization.

EXAMPLES 32 TO 44

In the same manner as in Example 31 except for variously changing the kind of the starting material particles and the temperature of reduction, the acicular ferromagnetic alloy particles doped with silicon, chromium and nickel were obtained, the specific properties of the product being shown in Table 5.

The products of Examples 32 to 44 were uniform in particle size without the contamination of dentrites according to the electron microscope photographic observation.

EXAMPLE 45

In the same manner as in Example 31, the acicular ferromagnetic alloy particles doped with silicon, chromium, nickel and magnesium were prepared while using the acicular α-iron(III) oxide hydroxide particles doped with silicon, chromium, nickel and magnesium obtained in Example 14 and the temperature of reduction of 400° C.

The thus produced acicular ferromagnetic alloy particles doped with silicon, chromium, nickel and magnesium showed the same X-ray diffraction pattern of a single phase of body-centered cubic lattice as that of iron, and as the result of fluorescent X-ray analysis, 0.506 atomic % calculated as Si/Fe(II) of silicon, 0.499 atomic % calculated as Cr/Fe(II) of chromium, 3.03 atomic % calculated as Ni/Fe(II) of nickel and 4.96 atomic % calculated as Mg/Fe(II) of magnesium were detected in the product. Accordingly, it is considered that iron, silicon, chromium, nickel and magnesium are in a state of solid solution.

Figure 9:
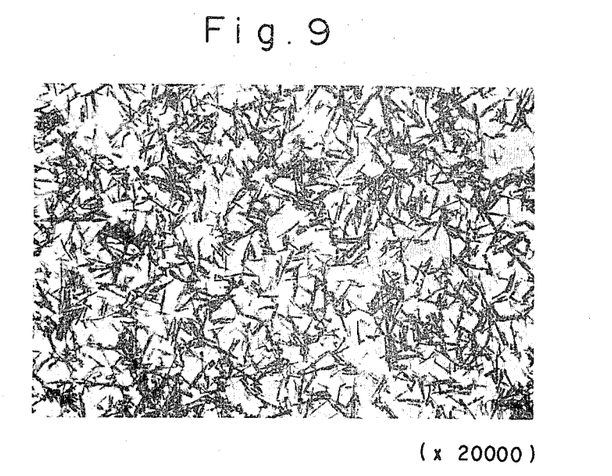

FIG. 9 shows the electron microscope photograph of 20000 times in magnification of the acicular ferromagnetic alloy particles. As is seen in FIG. 9, the thus obtained particles was 0.24 μm in length and the axial ratio of 9:1 on the average and the particle size thereof was uniform without the contamination of dentrites. The specific surface area and the apparent density of the particles were 45.6 m$^2$/g and 0.46 g/ml, respectively. And the particles had 1300 Oe of coercive force and 155.2 emu/g of saturation magnetization.

EXAMPLES 46 TO 60

In the same manner as in Example 45 except for variously changing the kind of the starting material particles and the temperature of reduction, the acicular ferromagnetic alloy particles doped with silicon, chromium, nickel and magnesium were obtained, the specific properties of the product being shown in Table 6.

The products of Examples 46 to 60 were uniform in particle size without the contamination of the dentrites according to the electron microscope photographic observation.

COMPARATIVE EXAMPLE 2

Figure 10:
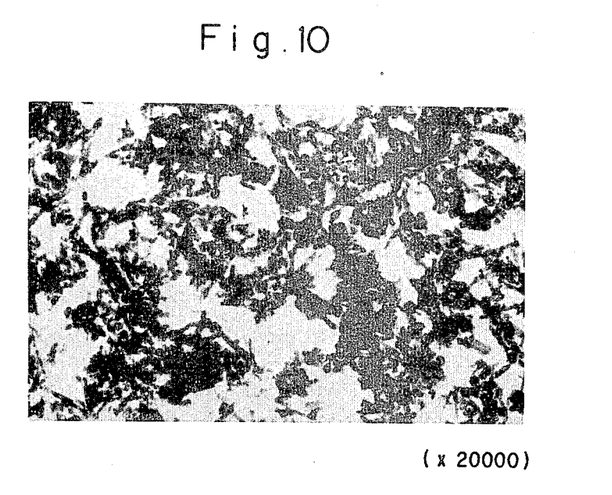

In the same manner as in Example 31, the acicular ferromagnetic iron particles were prepared while using the acicular α-iron(III) oxide hydroxide particles obtained in Comparative Example 1. As is seen in FIG. 10, the electron microscope photograph of 20000 times in magnification of the product, the length of the particle was 0.20 μm and the axial ratio of the particles was 2:1. The deformation of acicularity of the particles and the non-uniformity in particle size were also found. And the specific surface area and the apparent density of the particles were 15.8 m$^2$/g and 0.17 g/ml, respectively. Their magnetic properties were inferior, the coercive force and the saturation magnetization being 704 Oe and 160.3 emu/g.

PRODUCTION OF MAGNETIC TAPE

EXAMPLE 61

A magnetic paint was prepared by compounding the acicular ferromagnetic alloy particles doped with silicon, chromium and nickel obtained in Example 31, a suitable amount of a dispersing agent, a copolymer of vinyl chloride and vinyl acetate, thermoplastic polyurethane and a mixed solvent comprising toluene, methyl ethyl ketone and methyl isobutyl ketone in a predetermined composition and by introducing the mixture to a ball mill and mixing to disperse therein for 8 hours. After adding the mixed solvent to the thus prepared magnetic paint to be a suitable viscosity, the paint was applied onto a polyester film and dried according to the ordinary method to produce a magnetic tape. The coercive force (Hc), the residual magnetic flux density (Br), squareness ratio (Br/Bm), and the orientation ratio of the thus obtained magnetic tape were 1030 Oe, 3720 Gauss, 0.706 and 1.66, respectively.

EXAMPLES 62 TO 90 AND COMPARATIVE EXAMPLE 3

In the same manner as in Example 61 except for variously changing the kind of the acicular ferromagnetic particles, the magnetic tapes were produced. The specific properties of the thus obtained magnetic tapes are shown in Table 7.

TABLE 1

Production of acicular particles of α-FeO(OH) doped with Si, Cr and Ni

| Examples and Comparative Example | Aqueous Fe(II) solution | | | Aqueous NaOH solution | | Water-soluble Si salt | | | | Water-soluble Cr salt | | | | Water-soluble Ni salt | | | | Reaction time (hour) |
|---|---|---|---|---|---|---|---|---|---|---|---|---|---|---|---|---|---|---|
| | Kind | Concentration (mol/l) | Used amount (l) | Concentration (N) | Used amount (l) | Kind | Added amount (atomic %) | Time of addition* | | Kind | Added amount (atomic %) | Time of addition* | | Kind | Added amount (atomic %) | Time of addition* | | |
| Example 1 | FeSO₄ | 1.20 | 300 | 5.45 | 400 | Sodium silicate | 0.20 | B | | Cr₂(SO₄)₃ | 0.50 | B | | NiSO₄ | 3.0 | B | | 6.3 |
| Example 2 | " | " | " | 5.48 | " | Sodium silicate | 0.50 | " | | " | 0.70 | " | | " | 5.0 | " | | 6.9 |
| Example 3 | " | " | " | 6.24 | " | Sodium silicate | 0.35 | " | | " | 3.00 | " | | " | 4.0 | " | | 6.8 |
| Example 4 | " | " | " | 6.21 | " | Sodium silicate | 0.20 | " | | " | 1.0 | " | | " | 2.0 | " | | 7.0 |
| Example 5 | " | " | " | 5.47 | " | Sodium silicate | 0.25 | " | | " | 0.5 | " | | " | 5.0 | " | | 6.0 |
| Example 6 | " | 1.68 | " | 7.20 | " | Sodium silicate | 1.00 | " | | " | 0.30 | " | | " | 5.0 | " | | 7.9 |
| Example 7 | " | " | " | 7.18 | " | Sodium silicate | 0.50 | " | | " | 0.60 | A | | " | 4.0 | " | | 9.3 |
| Example 8 | " | " | " | 7.16 | " | Sodium silicate | 0.40 | " | | " | 0.60 | B | | " | 3.0 | A | | 9.5 |
| Example 9 | " | " | " | 7.18 | " | Sodium silicate | 0.50 | " | | " | 0.70 | A | | " | 3.0 | " | | 9.3 |
| Example 10 | " | 1.20 | " | 6.21 | " | Potassium silicate | 0.35 | " | | " | 0.50 | B | | " | 4.0 | B | | 6.9 |
| Example 11 | " | " | " | 6.20 | " | Sodium silicate | 0.20 | C | | " | 0.30 | C | | " | 3.0 | C | | 7.0 |
| Example 12 | " | " | " | 6.25 | " | Sodium silicate | 0.50 | B | | " | 1.0 | D | | " | 3.0 | D | | 6.3 |
| Example 13 | FeCl₂ | 1.68 | " | 7.16 | " | Sodium silicate | 0.35 | " | | CrCl₃ | 0.5 | B | | NiCl₂ | 4.0 | B | | 9.9 |
| Comparative Example 1 | FeSO₄ | 1.2 | " | 5.30 | " | — | — | — | | — | — | — | | — | — | — | | 12.0 |

*A: Water-soluble salt was added to an aqueous Fe(II) solution.
B: Water-soluble salt was added to an aqueous alkali solution.
C: Water-soluble salt was added to an aqueous suspension of Fe(OH)₂ in advance of the blowing of an oxygen-containing gas.
D: Water-soluble salt was added to an aqueous suspension of Fe(OH)₂ during the blowing of an oxygen-containing gas.

TABLE 2

Particle properties of acicular particles of α-FeO(OH) doped with Si, Cr and Ni

| Examples and Comparative Example | Si/Fe(II) (atomic %) | Cr/Fe(II) (atomic %) | Ni/Fe(II) (atomic %) | Length of long axis (μm) | Axial ratio (long axis: short axis) |
|---|---|---|---|---|---|
| Example 1 | 0.204 | 0.496 | 3.02 | 0.50 | 28:1 |
| Example 2 | 0.505 | 0.695 | 5.04 | 0.45 | 25:1 |
| Example 3 | 0.355 | 2.990 | 4.03 | 0.40 | 20:1 |
| Example 4 | 0.203 | 0.996 | 2.05 | 0.44 | 28:1 |
| Example 5 | 0.257 | 0.497 | 5.01 | 0.38 | 30:1 |
| Example 6 | 1.030 | 0.298 | 5.02 | 0.45 | 25:1 |
| Example 7 | 0.500 | 0.596 | 4.00 | 0.60 | 25:1 |
| Example 8 | 0.403 | 0.600 | 3.03 | 0.60 | 28:1 |
| Example 9 | 0.505 | 0.698 | 3.04 | 0.55 | 28:1 |
| Example 10 | 0.354 | 0.495 | 4.02 | 0.55 | 30:1 |
| Example 11 | 0.204 | 0.296 | 3.03 | 0.60 | 35:1 |
| Example 12 | 0.504 | 0.996 | 3.05 | 0.45 | 30:1 |
| Example 13 | 0.354 | 0.496 | 4.02 | 0.50 | 28:1 |
| Comparative Example 1 | — | — | — | 0.45 | 9:1 |

TABLE 3

Production of acicular particles of α-FeO(OH) doped with Si, Cr, Ni and Mg

| Examples | Aqueous Fe(II) solution Kind | Concentration (mol/l) | Used amount (l) | Aqueous NaOH solution Concentration (N) | Used amount (l) | Water-soluble Si salt Kind | Added amount (atomic %) | Time of addition* | Water-soluble Cr salt Kind | Added amount (atomic %) | Time of addition* | Water-soluble Ni salt Kind | Added amount (atomic %) | Time of addition* | Water-soluble Mg salt Kind | Added amount (atomic %) | Time of addition* | Reaction time (hour) |
|---|---|---|---|---|---|---|---|---|---|---|---|---|---|---|---|---|---|---|
| Example 14 | FeSO₄ | 1.20 | 300 | 5.46 | 400 | Sodium silicate | 0.50 | B | Cr₂(SO₄)₃ | 0.50 | B | NiSO₄ | 3.0 | B | MgSO₄ | 5.0 | B | 5.1 |
| Example 15 | " | 1.68 | " | 7.64 | " | Sodium silicate | 0.35 | " | " | 0.50 | " | " | 5.0 | " | " | 3.0 | " | 8.8 |
| Example 16 | " | " | " | 7.26 | " | Sodium silicate | 0.50 | " | " | 1.0 | " | " | 4.0 | " | " | 2.0 | " | 9.0 |
| Example 17 | " | " | " | 7.31 | " | Sodium silicate | 0.20 | " | " | 0.3 | " | " | 2.0 | " | " | 7.0 | A | 10.4 |
| Example 18 | " | " | " | 7.51 | " | Sodium silicate | 0.50 | " | " | 0.7 | " | " | 3.0 | " | " | 10.0 | B | 8.0 |
| Example 19 | " | 1.20 | " | 6.49 | " | Sodium silicate | 0.35 | " | " | 0.4 | " | " | 2.0 | " | " | 15.0 | " | 5.3 |
| Example 20 | " | " | " | 6.42 | " | Sodium silicate | 0.20 | " | " | 3.0 | " | " | 4.0 | " | " | 5.0 | " | 6.5 |
| Example 21 | " | " | " | 6.26 | " | Sodium silicate | 1.00 | " | " | 0.30 | " | " | 3.0 | " | " | 1.0 | " | 4.2 |
| Example 22 | " | 1.68 | " | 7.10 | " | Sodium silicate | 0.35 | " | " | 0.60 | A | " | 3.0 | " | " | 4.0 | " | 8.8 |
| Example 23 | " | " | " | 7.47 | " | Sodium silicate | 0.20 | " | " | 0.50 | B | " | 3.0 | A | " | 5.0 | " | 8.5 |
| Example 24 | FeCl₂ | " | " | 7.29 | " | Sodium silicate | 0.35 | " | CrCl₃ | 0.50 | " | NiCl₂ | 3.0 | " | MgCl₂ | 5.0 | B | 8.8 |
| Example 25 | FeSO₄ | " | " | 7.47 | " | Potassium silicate | 0.35 | " | Cr₂(SO₄)₃ | 0.50 | " | NiSO₄ | 3.0 | " | MgSO₄ | 5.0 | " | 8.8 |
| Example 26 | " | " | " | 7.46 | " | Sodium silicate | 0.20 | " | " | 0.40 | A | " | 3.0 | A | " | 5.0 | A | 9.0 |
| Example 27 | " | 1.2 | " | 6.51 | " | Sodium silicate | 0.20 | C | " | 0.50 | C | " | 3.0 | C | " | 5.0 | C | 8.6 |
| Example 28 | " | " | " | 6.42 | " | Sodium silicate | 0.20 | B | " | 0.50 | D | " | 3.0 | D | " | 3.0 | D | 8.8 |

*A: Water-soluble salt was added to an aqueous Fe(II) solution.
B: Water-soluble salt was added to an aqueous alkali solution.
C: Water-soluble salt was added to an aqueous suspension of Fe(OH)₂ in advance of the blowing of an oxygen-containing gas.
D: Water-soluble salt was added to an aqueous suspension of Fe(OH)₂ during the blowing of an oxygen-containing gas.

TABLE 4

Particle properties of acicular particles of α-FeO(OH) doped with Si, Cr, Ni and Mg

| Examples | Si/Fe(II) (atomic %) | Cr/Fe(II) (atomic %) | Ni/Fe(II) (atomic %) | Mg/Fe(II) (atomic %) | Length of long axis (μm) | Axial ratio (long axis: short axis) |
|---|---|---|---|---|---|---|
| Example 14 | 0.504 | 0.498 | 3.03 | 4.98 | 0.55 | 33:1 |
| Example 15 | 0.353 | 0.495 | 5.00 | 3.00 | 0.65 | 45:1 |
| Example 16 | 0.502 | 0.994 | 4.04 | 2.01 | 0.60 | 35:1 |
| Example 17 | 0.203 | 0.296 | 2.01 | 6.98 | 0.60 | 40:1 |
| Example 18 | 0.505 | 0.695 | 3.04 | 10.02 | 0.62 | 37:1 |
| Example 19 | 0.354 | 0.398 | 2.01 | 14.94 | 0.60 | 35:1 |
| Example 20 | 0.205 | 2.970 | 4.02 | 4.97 | 0.64 | 35:1 |
| Example 21 | 1.060 | 0.299 | 3.05 | 1.01 | 0.60 | 33:1 |
| Example 22 | 0.356 | 0.600 | 3.04 | 4.00 | 0.63 | 40:1 |
| Example 23 | 0.207 | 0.496 | 3.01 | 5.05 | 0.60 | 40:1 |
| Example 24 | 0.355 | 0.498 | 3.02 | 4.97 | 0.65 | 40:1 |
| Example 25 | 0.353 | 0.497 | 3.02 | 4.98 | 0.65 | 40:1 |
| Example 26 | 0.201 | 0.317 | 3.04 | 5.02 | 0.62 | 35:1 |
| Example 27 | 0.206 | 0.496 | 3.03 | 5.02 | 0.65 | 40:1 |
| Example 28 | 0.206 | 0.496 | 3.03 | 4.96 | 0.65 | 40:1 |

TABLE 5

Properties of acicular ferromagnetic alloy particles doped with Si, Cr and Ni

| Examples and Comparative Example | Kind of particles to be treated (Examples and Comparative Example) | Reduction Temperature (°C.) | Si/FE(II) (atomic %) | Cr/Fe(II) (atomic %) | Ni/Fe(II) (atomic %) | Length of long axis (μm) | Axial ratio (long axis: short axis) | Specific surface area (m²/g) | Saturation magnetization (σs) (emu/g) | Coercive force (Hc) (Oe) |
|---|---|---|---|---|---|---|---|---|---|---|
| Example 31 | Example 1 | 390 | 0.203 | 0.498 | 3.02 | 0.28 | 8:1 | 38.6 | 164.5 | 1130 |
| Example 32 | Example 2 | 400 | 0.501 | 0.696 | 5.01 | 0.25 | 9:1 | 39.6 | 164.4 | 1200 |
| Example 33 | Example 3 | 350 | 0.353 | 2.99 | 4.04 | 0.30 | 8:1 | 41.6 | 150.6 | 965 |
| Example 34 | Example 4 | 420 | 0.202 | 0.998 | 2.01 | 0.25 | 9:1 | 37.5 | 155.4 | 1030 |
| Example 35 | Example 5 | 400 | 0.254 | 0.496 | 5.03 | 0.20 | 11:1 | 43.7 | 165.8 | 1305 |
| Example 36 | Example 6 | 470 | 1.020 | 0.297 | 5.02 | 0.25 | 9:1 | 35.6 | 156.3 | 1080 |
| Example 37 | Example 7 | 380 | 0.503 | 0.598 | 4.03 | 0.25 | 8:1 | 36.4 | 162.4 | 980 |
| Example 38 | Example 8 | 340 | 0.402 | 0.600 | 3.02 | 0.25 | 8:1 | 37.4 | 156.3 | 960 |
| Example 39 | Example 9 | 400 | 0.501 | 0.696 | 3.03 | 0.25 | 8:1 | 35.6 | 166.5 | 975 |
| Example 40 | Example 10 | 380 | 0.354 | 0.499 | 4.03 | 0.30 | 10:1 | 40.0 | 165.2 | 1145 |
| Example 41 | Example 11 | 390 | 0.202 | 0.300 | 3.02 | 0.30 | 10:1 | 38.8 | 162.4 | 1180 |
| Example 42 | Example 12 | 400 | 0.502 | 1.00 | 3.00 | 0.25 | 9:1 | 39.7 | 156.3 | 1050 |
| Example 43 | Example 13 | 400 | 0.353 | 0.498 | 4.02 | 0.28 | 10:1 | 38.4 | 165.4 | 1120 |
| Example 44 | Example 29 | 390 | 0.253 | 0.499 | 5.02 | 0.20 | 12:1 | 44.8 | 166.3 | 1302 |
| Comparative Example 2 | Comparative Example 1 | 380 | — | — | — | 0.20 | 2:1 | 15.8 | 160.3 | 704 |

TABLE 6

Properties of acicular ferromagnetic alloy particles doped with Si, Cr, Ni and Mg

| Examples | Kind of particles to be treated (Examples) | Reduction Temperature (°C.) | Si/Fe(II) (atomic %) | Cr/Fe(II) (atomic %) | Ni/Fe(II) (atomic %) | Mg/Fe(II) (atomic %) | Length of long axis (μm) | Axial ratio (long axis: short axis) | Specific surface area (m²/g) | Saturation magnetization (σs) (emu/g) | Coercive force (Hc) (Oe) |
|---|---|---|---|---|---|---|---|---|---|---|---|
| Example 45 | Example 14 | 400 | 0.506 | 0.499 | 3.03 | 4.96 | 0.24 | 9:1 | 45.6 | 155.2 | 1300 |
| Example 46 | Example 15 | 400 | 0.354 | 0.500 | 5.01 | 3.01 | 0.40 | 12:1 | 44.0 | 165.4 | 1290 |
| Example 47 | Example 16 | 430 | 0.503 | 0.998 | 4.05 | 2.02 | 0.35 | 9:1 | 42.0 | 157.2 | 1092 |
| Example 48 | Example 17 | 350 | 0.202 | 0.295 | 2.01 | 6.97 | 0.35 | 11:1 | 40.0 | 132.6 | 1160 |
| Example 49 | Example 18 | 400 | 0.509 | 0.697 | 3.03 | 10.01 | 0.35 | 10:1 | 44.3 | 133.7 | 1225 |
| Example 50 | Example 19 | 450 | 0.352 | 0.400 | 2.02 | 14.95 | 0.30 | 10:1 | 39.4 | 128.4 | 1230 |
| Example 51 | Example 20 | 470 | 0.203 | 2.980 | 4.01 | 4.99 | 0.25 | 7:1 | 47.4 | 134.3 | 1060 |
| Example 52 | Example 21 | 430 | 1.080 | 0.301 | 3.06 | 1.02 | 0.30 | 9:1 | 35.6 | 148.2 | 1120 |
| Example 53 | Example 22 | 380 | 0.357 | 0.601 | 3.05 | 4.01 | 0.30 | 11:1 | 45.0 | 153.6 | 1100 |
| Example 54 | Example 23 | 380 | 0.206 | 0.495 | 3.01 | 5.06 | 0.30 | 12:1 | 46.0 | 155.5 | 1130 |
| Example 55 | Example 24 | 380 | 0.357 | 0.497 | 3.03 | 4.95 | 0.28 | 12:1 | 45.3 | 157.4 | 1285 |
| Example 56 | Example 25 | 380 | 0.353 | 0.499 | 3.00 | 4.99 | 0.26 | 12:1 | 44.6 | 154.6 | 1310 |
| Example 57 | Example 26 | 340 | 0.204 | 0.399 | 3.06 | 5.03 | 0.30 | 10:1 | 40.3 | 149.5 | 1120 |
| Example 58 | Example 27 | 400 | 0.205 | 0.501 | 3.02 | 5.02 | 0.28 | 11:1 | 43.5 | 157.6 | 1305 |
| Example 59 | Example 28 | 400 | 0.208 | 0.496 | 3.01 | 4.98 | 0.30 | 12:1 | 44.2 | 160.3 | 1300 |
| Example 60 | Example 29 | 400 | 0.351 | 0.501 | 4.99 | 3.03 | 0.30 | 13:1 | 44.6 | 163.6 | 1295 |

TABLE 7

| Examples and Comparative Example | Kind of magnetic particles (Examples and Comparative Example) | Properties of Tape | | | |
|---|---|---|---|---|---|
| | | Coercive force (Hc) (Oe) | Residual magnetic flux density (Br) (Gauss) | Squareness ratio (Br/Bm) | Orientation ratio (Br/Bm)∥ / (Br/Bm)⊥ |
| Example 61 | Example 31 | 1030 | 3720 | 0.706 | 1.66 |
| Example 62 | Example 32 | 1084 | 3660 | 0.710 | 1.72 |
| Example 63 | Example 33 | 854 | 3550 | 0.686 | 1.64 |
| Example 64 | Example 34 | 950 | 3610 | 0.692 | 1.68 |
| Example 65 | Example 35 | 1155 | 3920 | 0.746 | 2.03 |
| Example 66 | Example 36 | 990 | 3610 | 0.701 | 1.68 |
| Example 67 | Example 37 | 863 | 3590 | 0.694 | 1.66 |
| Example 68 | Example 38 | 852 | 3560 | 0.688 | 1.63 |
| Example 69 | Example 39 | 860 | 3620 | 0.692 | 1.68 |
| Example 70 | Example 40 | 1011 | 3740 | 0.724 | 1.90 |
| Example 71 | Example 41 | 1066 | 3690 | 0.712 | 1.84 |
| Example 72 | Example 42 | 942 | 3660 | 0.701 | 1.69 |
| Example 73 | Example 43 | 1010 | 3690 | 0.711 | 1.73 |
| Example 74 | Example 44 | 1164 | 3900 | 0.744 | 2.04 |
| Example 75 | Example 45 | 1186 | 3670 | 0.713 | 1.70 |
| Example 76 | Example 46 | 1150 | 3860 | 0.740 | 2.13 |
| Example 77 | Example 47 | 975 | 3764 | 0.697 | 1.68 |
| Example 78 | Example 48 | 1012 | 3920 | 0.751 | 2.36 |
| Example 79 | Example 49 | 1096 | 3485 | 0.708 | 1.71 |
| Example 80 | Example 50 | 1100 | 3230 | 0.734 | 1.80 |
| Example 81 | Example 51 | 910 | 3596 | 0.684 | 1.66 |
| Example 82 | Example 52 | 992 | 3602 | 0.716 | 1.75 |
| Example 83 | Example 53 | 963 | 3724 | 0.714 | 1.75 |
| Example 84 | Example 54 | 986 | 3860 | 0.725 | 1.94 |
| Example 85 | Example 55 | 1140 | 3624 | 0.738 | 2.10 |
| Example 86 | Example 56 | 1175 | 3700 | 0.742 | 2.30 |
| Example 87 | Example 57 | 980 | 3940 | 0.754 | 2.40 |
| Example 88 | Example 58 | 1170 | 3742 | 0.734 | 2.11 |
| Example 89 | Example 59 | 1183 | 3790 | 0.741 | 2.25 |
| Example 90 | Example 60 | 1155 | 3812 | 0.754 | 2.42 |
| Comparative Example 3 | Comparative Example 2 | 569 | 2230 | 0.553 | 1.20 |

What is claimed is:

1. Acicular ferromagnetic alloy particles doped with silicon, chromium and nickel.

2. Acicular ferromagnetic alloy particles doped with silicon, chromium, nickel and magnesium.

3. A process for producing acicular ferromagnetic alloy particles doped with silica, chromium and nickel, which comprises heating at 300° to 500° C. under reducing atmosphere acicular particles of α-iron(III) oxide hydroxide doped with silicon, chromium and nickel or acicular particles of α-ferric oxide doped with silicon, chromium and nickel obtained by dehydrating the acicular particles of α-iron(II) oxide hydroxide doped with silicon, chromium and nickel.

4. The process of claim 3, wherein a water-soluble silicate, a water-soluble chromium salt and a water-soluble nickel salt are added in forming the acicular particles of α-iron(III) oxide hydroxide doped with silicon, chromium and nickel by blowing an oxygen-containing gas into an aqueous suspension of pH of over 11 and containing ferrous hydroxide which is prepared by reacting an aqueous solution of ferrous salt and an aqueous alkali solution.

5. The process of claim 4, wherein the water-soluble silicate in an amount of 0.1 to 1.7 atomic % calculated as the ratio of Si to Fe(II) and based on the amount of ferrous hydroxide in the suspension is added into the aqueous alkali solution or the aqueous suspension in advance of the blowing of the oxygen-containing gas.

6. The process of claim 4, wherein the water-soluble chromium salt in an amount of 0.1 to 5.0 atomic % calculated as the ratio of Cr to Fe(II) and based on the amount of ferrous hydroxide in the suspension is added into the aqueous suspension of ferrous salt, the aqueous alkali solution, the aqueous suspension in advance of the blowing of the oxygen-containing gas or the aqueous suspension during the blowing of the oxygen-containing gas.

7. The process of claim 4, wherein the water-soluble nickel salt in an amount of 0.1 to 7.0 atomic % calculated as the ratio of Ni to Fe(II) and based on the amount of ferrous hydroxide in the suspension is added into the aqueous solution of ferrous salt, the aqueous alkali solution, the aqueous suspension in advance of the blowing of the oxygen-containing gas or the aqueous suspension during the blowing of the oxygen-containing gas.

8. A process for producing acicular ferromagnetic alloy particles doped with silicon, chromium, nickel and magnesium, which comprises heating at 300° to 500° C. under reducing atmosphere acicular particles of α-iron(III) oxide hydroxide doped with silicon, chromium, nickel and magnesium or acicular particles of α-ferric oxide doped with silicon, chromium, nickel and magnesium obtained by dehydrating the acicular particles of α-iron(III) oxide hydroxide doped with silicon, chromium, nickel and magnesium.

9. The process of claim 8, wherein a water-soluble silicate, a water-soluble chromium salt, a water-soluble nickel salt and a water-soluble magnesium salt are added in forming the acicular particles of α-iron(III) oxide hydroxide doped with silicon, chromium, nickel and magnesium by blowing an oxygen-containing gas into an aqueous suspension of pH of over 11 and containing ferrous hydroxide which is prepared by reacting an aqueous solution of ferrous salt and an aqueous alkali solution.

10. The process of claim 9, wherein the water-soluble silicate in an amount of 0.1 to 1.7 atomic % calculated as the ratio of Si to Fe(II) and based on the amount of ferrous hydroxide in the suspension is added into the aqueous alkali solution or the aqueous suspension in advance of the blowing of the oxygen-containing gas.

11. The process of claim 9, wherein the water-soluble chromium salt in an amount of 0.1 to 5.0 atomic % calculated as the ratio of Cr to Fe(II) and based on the amount of ferrous hydroxide in the suspension is added into the aqueous suspension of ferrous salt, the aqueous alkali solution, the aqueous suspension in advance of the blowing of the oxygen-containing gas or the aqueous suspension during the blowing of the oxygen-containing gas.

12. The process of claim 9, wherein the water-soluble nickel salt in an amount of 0.1 to 7.0 atomic % calculated as the ratio of Ni to Fe(II) and based on the amount of ferrous hydroxide in the suspension is added into the aqueous solution of ferrous salt, the aqueous alkali solution, the aqueous suspension in advance of the blowing of the oxygen-containing gas or the aqueous suspension during the blowing of the oxygen-containing gas.

13. The process of claim 9, wherein the water-soluble magnesium salt in an amount of 0.1 to 15.0 atomic % calculated as the ratio of Mg to Fe(II) and based on the amount of ferrous hydroxide in the suspension is added into the aqueous solution of ferrous salt, the aqueous alkali solution, the aqueous suspension in advance of the blowing of the oxygen-containing gas or the aqueous suspension during the blowing of the oxygen-containing gas.

14. Acicular ferromagnetic alloy particles doped with silicon, chromium and nickel obtained by heating at 300° to 500° C. under reducing atmosphere acicular particles of α-iron(III) oxide hydroxide doped with silicon, chromium and nickel or acicular particles of α-ferric oxide doped with silicon, chromium and nickel obtained by dehydrating the acicular particles of α-iron(III) oxide hydroxide doped with silicon, chromium and nickel.

15. Acicular ferromagnetic alloy particles doped with silicon, chromium, nickel and magnesium obtained by heating at 300° to 500° C. under reducing atmosphere acicular particules of α-iron(III) oxide hydroxide doped with silicon, chromium, nickel and magnesium or acicular particles of α-ferric oxide doped with silicon, chromium, nickel and magnesium obtained by dehydrating the acicular particles of α-iron(III) oxide hydroxide doped with silicon, chromium, nickel and magnesium.

* * * * *